United States Patent
Wang et al.

(10) Patent No.: US 10,015,730 B2
(45) Date of Patent: Jul. 3, 2018

(54) METHOD AND DEVICE FOR SELECTING HETEROGENEOUS NETWORK SERVING CELL BASED ON INTER-CELL COOPERATION

(71) Applicant: ZTE Corporation, Shenzhen, Guangdong (CN)

(72) Inventors: Shaopeng Wang, Shenzhen (CN); Hongfeng Qin, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/513,764

(22) PCT Filed: Mar. 18, 2015

(86) PCT No.: PCT/CN2015/074516
§ 371 (c)(1),
(2) Date: Mar. 23, 2017

(87) PCT Pub. No.: WO2015/184884
PCT Pub. Date: Dec. 10, 2015

(65) Prior Publication Data
US 2017/0295537 A1    Oct. 12, 2017

(30) Foreign Application Priority Data

Sep. 26, 2014 (CN) .......................... 2014 1 0505394

(51) Int. Cl.
*H04W 4/00*     (2018.01)
*H04W 48/16*    (2009.01)
(Continued)

(52) U.S. Cl.
CPC ....... *H04W 48/16* (2013.01); *H04W 36/0005* (2013.01); *H04W 48/20* (2013.01); *H04W 36/08* (2013.01); *H04W 72/0453* (2013.01)

(58) Field of Classification Search
CPC .............................. H04W 36/32; H04W 48/18
(Continued)

(56) References Cited

U.S. PATENT DOCUMENTS

2009/0137251 A1   5/2009 Ji
2011/0143800 A1   6/2011 Han
(Continued)

FOREIGN PATENT DOCUMENTS

CN   101583161 A   11/2009
CN   101772118 A    7/2010
(Continued)

OTHER PUBLICATIONS

International Search Report in international application No. PCT/CN2015/074516, dated Jul. 22, 2015, 2 pgs.
(Continued)

*Primary Examiner* — Kiet Doan
(74) *Attorney, Agent, or Firm* — Cooper Legal Group, LLC (57) ABSTRACT

A method and device for selecting a heterogeneous network serving cell based on inter-cell cooperation, which relate to the field of digital communications. The method disclosed in the embodiments of the present invention comprises: acquiring, by a central node base station in a heterogeneous network, alternative users in each cell in the heterogeneous network; and according to a pre-set alternative user selection criterion, selecting an alternative user in the entire network from the alternative users in all cells in the heterogeneous network; and if the alternative user in the entire network needs to conduct a reselection operation, initiating a cell reselection flow. Also disclosed is a device for selecting a heterogeneous network serving cell based on inter-cell cooperation corresponding to the method.

11 Claims, 5 Drawing Sheets

(51) Int. Cl.
*H04W 48/20* (2009.01)
*H04W 36/00* (2009.01)
*H04W 36/08* (2009.01)
*H04W 72/04* (2009.01)

(58) Field of Classification Search
USPC ..... 455/456.1, 436, 438, 434; 370/331, 252, 370/311
See application file for complete search history.

(56) References Cited

U.S. PATENT DOCUMENTS

| | | | |
|---|---|---|---|
| 2013/0021929 A1* | 1/2013 | Kim | H04B 7/024 370/252 |
| 2014/0301360 A1* | 10/2014 | Bontu | H04W 36/0083 370/331 |
| 2015/0146664 A1 | 5/2015 | Kobayashi et al. | |
| 2015/0195758 A1* | 7/2015 | Kim | H04W 24/10 370/252 |
| 2015/0201343 A1 | 7/2015 | Jung et al. | |

FOREIGN PATENT DOCUMENTS

| | | |
|---|---|---|
| CN | 102484573 A | 5/2012 |
| CN | 102845106 A | 12/2012 |
| CN | 102869072 A | 1/2013 |
| CN | 103650590 A | 3/2014 |
| EP | 2641425 A1 | 9/2013 |
| MX | 2013005677 A | 9/2013 |
| WO | 2010073059 A1 | 7/2010 |
| WO | 2013154479 A1 | 10/2013 |
| WO | 2014014328 A1 | 1/2014 |
| WO | 2014020781 A1 | 2/2014 |

OTHER PUBLICATIONS

English Translation of the Written Opinion of the International Search Authority in international application No. PCT/CN2015/074516, dated Jul. 22, 2015, 6 pgs.

Supplementary European Search Report in European application No. 15803147.6, dated Jun. 26, 2017, 24 pgs.

* cited by examiner

METHOD AND DEVICE FOR SELECTING HETEROGENEOUS NETWORK SERVING CELL BASED ON INTER-CELL COOPERATION

TECHNICAL FIELD

The disclosure relates to the field of digital communications, and in particular, to a solution for selecting a heterogeneous network serving cell of a Carrier Aggregation (CA) system based on inter-cell cooperation.

BACKGROUND

The heterogeneous network becomes a research hotspot of mobile communications because it can realize the optimization of system performance by improving the topological structure of the network. The heterogeneous network is composed of a high-power macro base stations and low-power nodes of network planning. The low-power nodes are under the coverage of the macro base stations and placed autonomously. The low-power nodes include a femtocell, a pico-cell, a relay station, and so on, which can realize coverage of hotspot region and shunt of cell services, so that a cell splitting gain is obtained. Because the power and coverage of different types of base stations are different, and the low-power node placed autonomously, the interference problems of control channels and service channels of different base stations are very outstanding in the heterogeneous network, so the heterogeneous network faces huge technical challenges.

In the next generation evolution system, for example, the 3GPP-LTE-A standard, enhanced Inter-Cell Interference Coordination (eICIC) schemes are adopted to solve the interference problems. The eICIC is one of the symbol key technologies in the LTE-A for improving the cell edge coverage and realizing the Range Extension (RE) with the intent to shunt the cell services. The eICIC schemes are divided into two types: an eICIC scheme based on the CA technology and the other eICIC scheme based on the time-domain Almost Blank Subframe (ABS). The ABS realizes service silence by configuring ABS subframes in an interfered cell, and the interfered cell uses these ABS subframes to provide services for users strongly interfered in the cell, so that the coordination of interferences between the cells is realized.

As one of the key technologies, the CA can not only provide a high-speed service on a large bandwidth formed by aggregation, but also can avoid interferences in a frequency domain which realizes the heterogeneous network at a Component Carrier (CC) resolution level. It is supposed that the bandwidth of the heterogeneous network is composed of two CCs, namely f1 and f2. In order to realize the interference coordination between the macro base station and the pico-cell, the f1 and f2 can be allocated to the users of the macro base station and the pico-cell respectively, so as to avoid the interferences of the service channel and the control channel of the users. Or, a cell centre user of the pico-cell can be allocated with the same CC as the macro base station, and an edge user is allocated with the CC different from that of the macro base station. The disadvantage of the scheme is that it can only be adopted by the LTE-A users, but cannot be compatible with the LTE users. The application of all the above technologies has an important premise, that is, the problem of selecting a user service cell from the cells needs to be solved at first. In a cellular mobile communication network, all users have a home service cell, which provides the users with broadcasting, service transmission and other services. In a traditional homogeneous network, selecting the user service cell is based on the measurement of received signal intensity. In the heterogeneous network, because the transmission power of added nodes is far lower than that of the macro base station, a method for selecting a service cell based on the received signal intensity will cause a very small coverage range of these nodes and does not realize the maximization of cell splitting gain. For the purpose of boosting the priority of the low-power nodes and extending the coverage range of the low-power nodes, the 3GPP meeting launches researches and discussions, and provides some cell selection and reselection algorithms in the enhanced LTE-A heterogeneous network, which mainly include an RE algorithm and a path loss algorithm presented by Qualcomm. The core idea of the RE algorithm is that in the traditional service cell selection algorithm, a bias value which is greater than 0 is added to the Reference Signal Receiving Power (RSRP) of the low-power node, and the bias value of the RSRP of the macro base station is 0, so as to reduce the threshold of the low-power node and increase the chance of a UE to select the low-power node as the serving cell. In the cell selection algorithm based on path loss, each UE selects the cell with the minimum path loss as the serving cell.

The above method obviously enlarges the coverage range of the low-power nodes, which is even similar to the macro base station. But for the users at the coverage edge of the low-power nodes, even though an interference elimination means is adopted to eliminate the influence of a strong interference source, a downlink Signal to Interference plus Noise Ratio (SINR) is very low due to the too low transmission power of its serving cell (the low-power node), therefore the spectral efficiency of the cell is reduced.

When a multi-antenna technology is adopted, the inter-cell interference coordination can be further performed in the spatial domain; for example, in a Coordinated Multi-Point (CoMP) transmission technology. Through the interaction of channel information of the mobile users between adjacent cells, the adjacent cells adopt a certain interference avoiding policy to the edge users or multiple cells perform joint transmission to the mobile users, thereby improving the throughput of the edge users and increasing the coverage of high data transmission rate, reducing the interferences of the edge users, and improving the throughput of the cells. In the heterogeneous network, the CoMP transmission technology can serve as an enhancement of the eICIC technology, and can further increase the system capacity based on a gain obtained by the eICIC technology.

At present, the cell selection and interference management are two independent processes. The cell selection increases the number of users of the low-power node through load balancing, and the interference management is used for solving the problem of the increase of inter-cell interferences. With the increase of density of the low-power nodes, if the processing is continued according to the above method, the complexity of an interference management algorithm will increase sharply, and the effectiveness of the interference management algorithm will be reduced, thus influencing the increase of the number of low-power node users.

SUMMARY

The disclosure provides a method and device for selecting a heterogeneous network serving cell based on inter-cell cooperation, so as to increase the system capacity of a low-power node.

To solve the above technical problem, the disclosure discloses a method for selecting a heterogeneous network serving cell based on inter-cell cooperation, which includes that:

a central node base station in a heterogeneous network obtains alternative users in each cell in the heterogeneous network, and selects an alternative user in the entire network from the alternative users in all cells in the heterogeneous network according to a pre-set alternative user selection criterion;

if the alternative user in the entire network needs to perform a reselection operation, a cell reselection flow is initiated.

In an embodiment, the method further includes that:

each cell base station in the heterogeneous network selects in this cell the alternative users in a cell according to the pre-set alternative user selection criterion, and reports the selected alternative users in the cell to the central node base station.

In an embodiment, in the above method, the alternative user selection criterion includes one or more of the followings:

a system rate maximizing criterion, a degree of freedom restoring criterion, and a frequency reuse criterion.

In an embodiment, in the above method, the system rate maximizing criterion is:

selecting the user with the maximum rate ratio $R_m(q)/R_m(j)$ in the rate ratios $R_m(q)/R_m(j)$ of cell reselection of all users as the alternative user, and $R_m(q)$ is the rate obtained in the reselected cell by the user m, and $R_m(j)$ is the rate obtained in the current serving cell j by the user m.

In an embodiment, in the above method, the rate ratio $R_m(q)/R_m(j)$ of cell reselection of the user is determined according to the following process:

calculating $R_m(q)$ and $R_m(j)$ respectively, so as to obtain the rate ratio $R_m(q)/R_m(j)$ of cell reselection of the users;

the rate obtained in each cell by each user is determined according to the following formula:

$$R_m(q^*) = \sum_{k \subset K} \frac{G(y_{q^*,k})E(R_{k,m,q^*})}{y_{q^*,k}}$$

where, $R_m(q^*)$ is the rate obtained in the cell $q^*$ by the user m;

$E(R_{k,m,q}^*)$ is the mathematical expectation of $R_{k,m,q}^*$, $R_{k,m,q}^*$ is the instantaneous average maximum data rate that the user m can realize on the carrier k of the cell $q^*$, and K is the total number of carriers in the cell $q^*$;

$y_{q^*,k} = \Sigma_{m \subset M} x_{m,q}^*$ is the number of users accessing the cell $q^*$; when $x_{m,q}^*$ is equal to 1, $q^*$ is the serving cell of the user m; when $x_{m,q}^*$ is equal to 0, $q^*$ is not the serving cell of the user m; M is the total number of users supported by the cell $q^*$;

$$G(y_{q^*,k}) = \sum_{m=1}^{y_{q^*,k}} \frac{1}{m}$$

is a diversity gain of multiple users.

In an embodiment, in the above method, the degree of freedom restoring criterion is:

in a spatial beam joint selection algorithm in the set time, selecting the user with the maximum number of beam closing times in the numbers of beam closing times of all users as the alternative user.

In an embodiment, in the above method, in the spatial beam joint selection algorithm in the set time, the process of determining the number of beam closing times of the user is as follows:

parameters A and $b_{k,q}$ when the overall system rate is the maximum are iteratively calculated, and the number of beam closing times of each user is counted in the process of calculating the parameters A and $b_{k,q}$ when the overall system rate is the maximum;

the overall system rate R composed of Q cells is calculated according to the following formula:

$$R = \Sigma_{q=1}^{Q} \Sigma_{k=1}^{K} \log_2(1 + a_{k,q} \text{SINR}_{k,m,q});$$

where, K is the number of carriers in the cell q;

$\text{SINR}_{k,m,q}$ is the SINR of the user m in a block fading scenario on the carrier k in the cell q;

when $a_{k,q}$ is equal to 1, the carrier k in the cell q is allocated to the user m; when $a_{k,q}$ is equal to 0, the carrier k in the cell q is not allocated to the user m.

In an embodiment, in the above method, the frequency reuse criterion is:

selecting the user with the maximum Fractional Frequency Reuse (FFR) in the FFRs of all users in the set time as the alternative user.

In an embodiment, in the above method, the FFR of the user is calculated according to the following formula:

$$FFR = FFR_1 \cdot P_1 + FFR_2 \cdot P_2 + FFR_3 \cdot P_3 + \ldots + FFR_Q \cdot P_Q$$

where, $FFR_1 = 1/3$, $FFR_2 = 2/3$, $FFR_3 = 1$, and $FFR_Q = 1/Q$; and $P_1, P_2, \ldots P_Q$ are weighting coefficients.

The disclosure also discloses a device for selecting a heterogeneous network serving cell based on inter-cell cooperation, which includes:

an alternative user selecting module, which is configured to obtain the alternative users in each cell in the heterogeneous network, and select an alternative user in the entire network from the alternative users in all cells in the heterogeneous network according to the pre-set alternative user selection criterion; and a cell reselecting module, which is configured to, if the alternative user in the entire network needs to perform the reselection operation, initiate the cell reselection flow.

In an embodiment, in the above device, the alternative user selection criterion includes one or more of the followings:

the system rate maximizing criterion, the degree of freedom restoring criterion, and the frequency reuse criterion.

In an embodiment, in the above device, the system rate maximizing criterion is:

selecting the user with the maximum rate ratio $R_m(q)/R_m(j)$ in the rate ratios $R_m(q)/R_m(j)$ of cell reselection of all users as the alternative user, and $R_m(q)$ is the rate obtained in the reselected cell by the user m, and $R_m(j)$ is the rate obtained in the current serving cell j by the user m.

In an embodiment, in the above device, the alternative user selecting module is configured to:

calculate $R_m(q)$ and $R_m(j)$ respectively, so as to obtain the rate ratio $R_m(q)/R_m(j)$ of cell reselection of the users;

the rate obtained in each cell by each user is determined according to the following formula:

$$R_m(q^*) = \sum_{k \subset K} \frac{G(y_{q^*,k})E(R_{k,m,q^*})}{y_{q^*,k}}$$

where, $R_m(q^*)$ is the rate obtained in the cell $q^*$ by the user m;
$E(R_{k,m,q}^*)$ is the mathematical expectation of $R_{k,m,q}^*$, $R_{k,m,q}^*$ is the instantaneous average maximum data rate that the user m can realize on the carrier k of the cell $q^*$, and K is the total number of carriers in the cell $q^*$;
$y_{q^*,k} = \sum_{m \subset M} x_{m,q}^*$ is the number of users accessing the cell $q^*$; when $x_{m,q}^*$ is equal to 1, $q^*$ is the serving cell of the user m; when $x_{m,q}^*$ is equal to 0, $q^*$ is not the serving cell of the user m; M is the total number of users supported by the cell $q^*$;

$$G(y_{q^*,k}) = \sum_{m=1}^{y_{q^*,k}} \frac{1}{m}$$

is the diversity gain of multiple users.

In an embodiment, in the above device, the degree of freedom restoring criterion is:
  in the spatial beam joint selection algorithm in the set time, selecting the user with the maximum number of beam closing times in the numbers of beam closing times of all users as the alternative user.

In an embodiment, in the above device, the alternative user selecting module is configured to determine the number of beam closing times of the user in the spatial beam joint selection algorithm in the set time, including that:
  the parameters A and $b_{k,q}$ when the overall system rate is the maximum are iteratively calculated, and the number of beam closing times of each user is counted in the process of calculating the parameters A and $b_{k,q}$ when the overall system rate is the maximum;
  the overall system rate R composed of Q cells is calculated according to the following formula:

$$R = \sum_{q=1}^{Q} \sum_{k=1}^{K} \log_2(1 + a_{k,q} SINR_{k,m,q});$$

where, K is the number of carriers in the cell q;
  $SINR_{k,m,q}$ is the SINR of the user m in a block fading scenario on the carrier k in the cell q;
  when $a_{k,q}$ is equal to 1, the carrier k in the cell q is allocated to the user m; when $a_{k,q}$ is equal to 0, the carrier k in the cell q is not allocated to the user m.

In an embodiment, in the above device, the frequency reuse criterion is:
  selecting the user with the maximum FFR in the FFRs of all users in the set time as the alternative user.

In an embodiment, in the above device, the alternative user selecting module is configured to calculate the FFR of the user according to the following formula:

$$FFR = FFR_1 \cdot P_1 + FFR_2 \cdot P_2 + FFR_3 \cdot P_3 + \ldots + FFR_Q \cdot P_Q;$$

where, $FFR_1 = 1/3$, $FFR_2 = 2/3$, $FFR_3 = 1$, and $FFR_Q = 1/Q$; and $P_1, P_2, \ldots P_Q$ are weighting coefficients.

In an embodiment, the device further includes:
  a reporting module, which is configured to, when the device is a cooperation cell base station in the heterogeneous network, select in this cell the alternative users in a cell according to the pre-set alternative user selection criterion, and report the selected alternative users in the cell to the central node base station.

The disclosure also provides a computer readable medium, in which a computer program is stored; the computer program includes a program instruction; when the program instruction is executed by a base station device, the device performs the method for selecting a heterogeneous network serving cell based on inter-cell cooperation.

The technical solution of the disclosure considers cell selection and interference management jointly, so that the complexity of an interference management algorithm is reduced, and the effectiveness of interference management is improved, thereby increasing the system capacity of a lower-power node.

DETAILED DESCRIPTION

The technical solution of the disclosure is elaborated below with reference to the accompanying drawings. It should be noted that, the embodiments of the disclosure and the characteristics in the embodiments can be combined under the condition of no conflicts.

Embodiment 1

The inventor of the application finds that the prior art mainly has the following disadvantages.

On an aspect, a large number of edge users emerge because of the introduction of low-power nodes; all the existing methods for selecting a cell are presented based on the signal intensity (an RE algorithm) or interference (a path loss method). But at the cell edge, the SINR influences the selection of users greatly.

On the other aspect, the low-power nodes introduced in the heterogeneous network adopts a multi-antenna technology; if the interference of an adjacent cell and spatial information are considered while selecting a serving cell, a better cell split gain can be obtained; but all the existing methods do not consider these factors.

So, in view of the above disadvantages, the inventor of the application puts forward that the serving cell of the edge users can be dynamically selected by a Dynamic Cell Selection (DCS) technology, and the number of users is increased by a cell diversity gain; besides, cell selection and interference management are considered jointly, so that the complexity of the interference management algorithm is reduced, and the effectiveness of interference management is improved, thereby increasing the system capacity of the lower-power node.

Based on the above idea, the present embodiment provides a method for selecting a heterogeneous network serving cell based on inter-cell cooperation. The heterogeneous network is composed of a macro base station and several low-power base stations under the coverage of the macro base station, such as a femtocell and a pico-cell. The carriers aggregated in the base station include $CC_1$, $CC_2$, ... $CC_k$. The method mainly includes that:

a central node base station in the heterogeneous network obtains alternative users in each cell in the heterogeneous network, and selects an alternative user in the entire network from the alternative users in all cells in the heterogeneous network according to a pre-set alternative user selection criterion; and if the alternative user in the entire network needs to perform a reselection operation, a cell reselection flow is initiated.

The process that the central node base station obtains the alternative users in each cell in the heterogeneous network is that: each cell base station in the heterogeneous network selects in this cell the alternative users in a cell according to the pre-set alternative user selection criterion, and reports the selected alternative users in the cell to the central node base station.

The alternative user selection criterion on which the central node base station and each cell base station are based at least includes one or more of the followings:

a system rate maximizing criterion, a degree of freedom restoring criterion, and a frequency reuse criterion.

In the embodiment, the system rate maximizing criterion is: selecting the user with the maximum rate ratio $R_m(q)/R_m(j)$ in the rate ratios $R_m(q)/R_m(j)$ of cell reselection of all users as the alternative user, and here $R_m(q)$ is the rate obtained in the reselected cell q by the user m, and $R_m(j)$ is the rate obtained in the current serving cell j by the user m. It should be noted that, the rate obtained by the user in each cell and involved in the present embodiment is an average rate value during a given time period.

Specifically, the process of determining the ratio $R_m(q)/R_m(j)$ of cell reselection of each user is as follows:

supposing there are M users in the system, and the rate obtained in the cell q* by the user m is:

$$R_m(q^*) = \sum_{k \subset K} \frac{G(y_{q^*,k})E(R_{k,m,q^*})}{y_{q^*,k}} \quad (1)$$

where, M is the total number of users supported by the cell q*;

$E(R_{k,m,q}^*)$ is the mathematical expectation of $R_{k,m,q}^*$, $R_{k,m,q}^*$ is the instantaneous average maximum data rate that the user m can realize on the carrier k of the cell q*, and K is the total number of carriers in the cell q*;

$y_q^*{}_{,k}=\Sigma_{m \subset M}x_{m,q}^*$ is the number of users accessing the cell q*; when $x_{m,q}^*$ is equal to 1, q* is the serving cell of the user m; when $x_{m,q}^*$ is equal to 0, q* is not the serving cell of the user m;

$$G(y_{q^*,k}) = \sum_{m=1}^{y_{q^*,k}} \frac{1}{m}$$

is a diversity gain of multiple users, which depends on the number of users competing for the same resource.

When the rate $R_m(q^*)$ obtained in the cell q* by the user m is calculated in the above formula, a calculation mode of weighted rate is adopted.

In the present embodiment, the degree of freedom restoring criterion is: counting the numbers of beam closing times of all users in a spatial beam joint selection algorithm within the set time, and selecting the user with the maximum number of beam closing times as the alternative user.

It is supposed that the system is a downlink link of M users and K carriers, each the base station and each user respectively has N transmitting antennae and a receiving antenna, and the transmitted power on each carrier of each cell remains unchanged. A binary matrix $A=\{a_{k,m}|a_{k,m} \subset \{0, 1\}\}_{K \times M}$ is used for describing the carrier selection between users. When $a_{k,m}$ is equal to 1, the carrier k is allocated to the user m; or else, $a_{k,m}$ is equal to 0.

$S_{k,m,i}=h_{k,m,i}=b_{k,i}$ is used for representing a channel gain in a certain time slot, $h_{k,m,i}=[h^1_{k,m,i}, h^2_{k,m,i}, \ldots h^N_{k,m,i}]$ is used for representing a channel, and $b_{k,j} \in C^{N \times 1}$ is used for representing a beam forming matrix; if it is a block fading scenario, the SINR is:

$$SINR_{k,m,q} = \frac{P_q|h_{k,m,q}b_{k,q}|^2}{\sum_{i=1, i \neq q}^{N} a_{k,i}P_i|h_{k,m,i}b_{k,i}|^2 + \sigma_q^2} \quad (2)$$

If the rate of the mth user is defined as:

$$R_{m,q} = \Sigma_{k=1}^K \log_2(1+SINR_{k,m,q}) = \Sigma_{k=1}^K R_{k,m,q} \quad (3),$$

then the overall system rate composed of Q cells is:

$$R = \sum_{q=1}^{Q} \sum_{k=1}^{K} \log_2\left(1 + \frac{a_{k,q}P_q|h_{k,q,q}b_{k,q}|^2}{\sum_{i=1, i \neq q}^{N} a_{k,i}P_i|h_{k,q,i}b_{k,i}|^2 + \sigma_q^2}\right) = \quad (4)$$

$$\sum_{q=1}^{Q} \sum_{k=1}^{K} \log_2(1 + a_{k,q}SINR_{k,m,q}),$$

where, i is the adjacent cell except the cell q, i is equal to 1, 2, ..., Q, but i is not equal to q;

for finding the proper A and $b_{k,q}$, an alternately iterating method is adopted, which includes that: supposing that $b_{k,q}$ is known, it is tried to close a certain carrier, that is, $a_{k,m}$ is set to 0, so as to maximize the overall system rate to obtain the new A; then, the new $b_{k,q}$ is solved based on the new A, where $b_{k,q}$ represents a beam precoding vector on the carrier k of the user in the cell q. In the present embodiment, the frequency reuse criterion is: counting the FFRs of all users in a carrier beam joint selection algorithm within the set time, and selecting the user with the maximum FFR as the alternative user.

Note that, there may be multiple users in each cell, but there is only one user performing data transmission in the cell at any time, then, for any user m, $a_{k,m}$ is equal to $a_{k,q}$; that is, there is no need to differentiate the user m and the cell q in the subscripts of the parameters.

Specifically, the average FFR is defined as:

$$FFR = FFR_1 \cdot P_1 + FFR_2 \cdot P_2 + FFR_3 \cdot P_3 + \ldots + FFR_Q \cdot P_Q \quad (5)$$

where, $FFR_1 = 1/3$, $FFR_2 = 2/3$, $FFR_3 = 1$, and $FFR_Q = 1/Q$; and $P_1, P_2, \ldots P_Q$ are weighting coefficients.

Besides, in the above method, when a carrier beam of joint cell is selected, and the user satisfies a closing criterion, the transmission of carrier will be closed; the selection criterion 1 is: the user has the minimum SINR on the carrier compared with the cooperative scheduling user on the carrier; at the same time, the user is suffered from the maximum interference;

in the above method, when the carrier beam of joint cell is selected, and the user satisfies the closing criterion, the transmission of carrier will be closed; the selection criterion 2 is: the user has the minimum SINR on the carrier compared with the cooperative scheduling user on the carrier, at the same time, the user is suffered from the interference which is greater than a noise value;

in the above method, when the carrier beam of joint cell is selected, the FFR weight is equal to the number of users not closed on the carrier/the total number of cooperative scheduling users on the carrier.

In the above method, when the cell reselection is performed, judgement can be performed according to a weighted average rate criterion.

Specifically, the cell reselection criterion based on the weighted average rate includes the following two steps:

Step 1: $R_m^*(q)/R_m^*(j)$ of the user is calculated, where j is the original serving cell, and q is the other cell;

Step 2: if the user m* selects q*, the corresponding $R_m^*(q^*)/R_m^*(j)$ is greater than a threshold R_th, namely:

$$R_m^*(q)/R_m^*(j) > R\_th \quad (6)$$

and the number of users in the cell is fewer than $U_m$, then the user m* changes the serving cell from j to q*;

Step 3: the cell and the serving cell q* update their own service user sets respectively.

The specific implementation of the above method is elaborated below by taking the LTE-A system for example.

Figure 1:
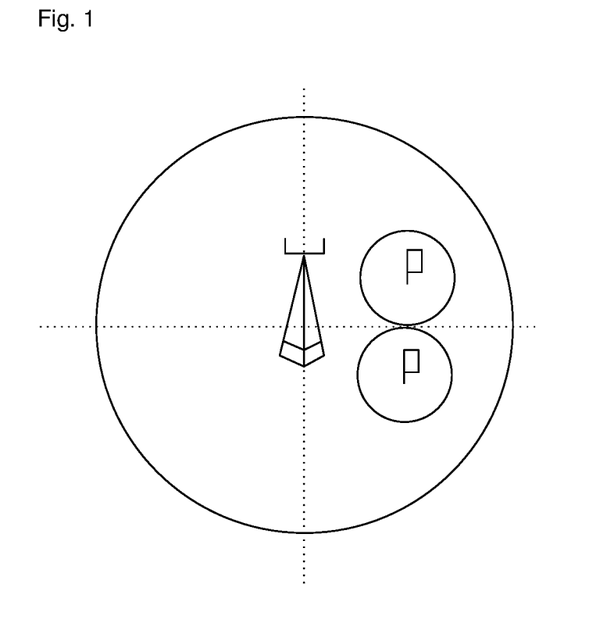
FIG. 1 is a schematic diagram of a heterogeneous network.

As shown in FIG. 1, the heterogeneous network is composed of a macro-cell and two pico-cells. The radius of the macro-cell is 500 m, and the power is 43 dBm. The two pico-cells are under the coverage of the macro-cell. The macro-cell is set as the cell 1, and the two pico-cells are set as the cell 2 and the cell 3. The bandwidths of all the base stations are formed by aggregating two carriers. It is supposed that there are three cells and 40 users.

Figure 2A:
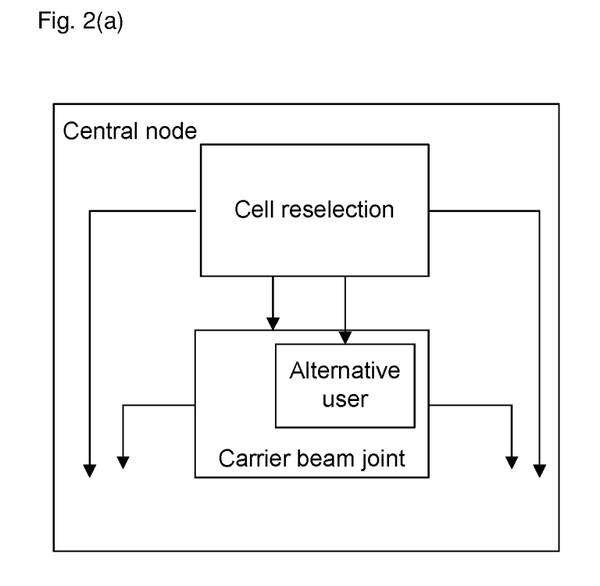
FIG. 2(a) is an implementation block diagram of a central node base station for selecting a heterogeneous network serving cell based on inter-cell cooperation according to an embodiment of the disclosure.
Figure 2B:
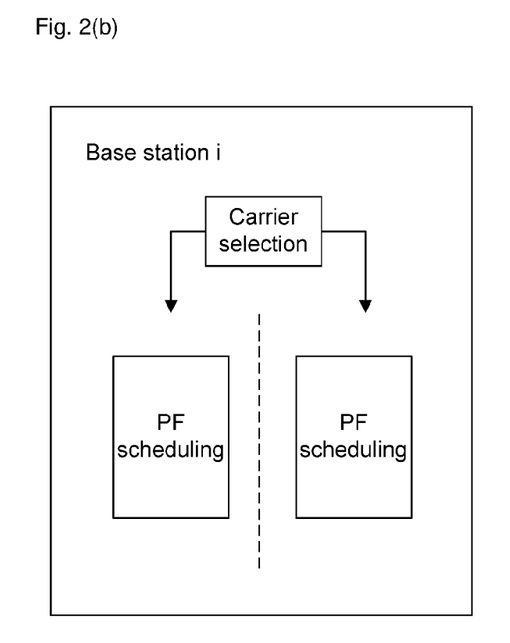
FIG. 2(b) is an implementation block diagram of a cooperation base station i for selecting a heterogeneous network serving cell based on inter-cell cooperation according to an embodiment of the disclosure.
Figure 2C:
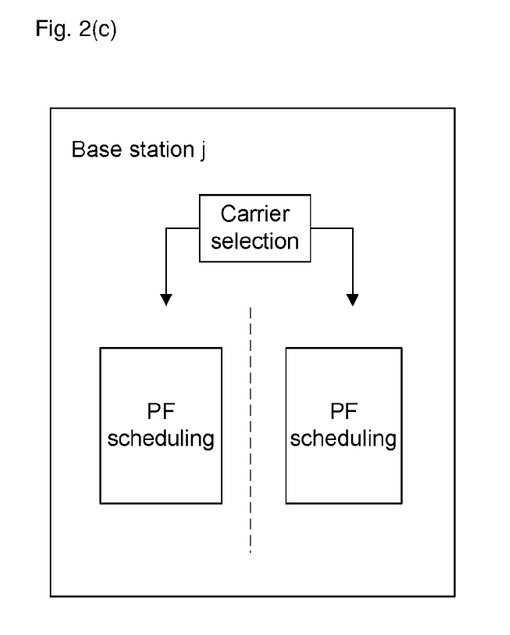
FIG. 2(c) is an implementation block diagram of a cooperation base station j for selecting a heterogeneous network serving cell based on inter-cell cooperation according to an embodiment of the disclosure.

FIG. 2 is an implementation block diagram based on the present embodiment, which is split into the following two layers:

the cooperation base station, for example, the base station i (as shown in FIG. 2b) and the base station j (as shown in FIG. 2c), and the central node base station (as shown in FIG. 2a), which can be any base station, for example, the macro-cell base station.

An independent fair scheduler (a PF scheduler) and carrier selection run on the cooperation base stations; the fair scheduler calculates a user scheduling priority according to the instantaneous average rate and the historical average rate of the user in the home base station of the user, then decides to schedule the user according to the priority sequence, finally schedules, based on an output result of a central node, the user on the selected carrier according to a jointly designed beam vector.

First of all, the central node base station runs the joint cell carrier selection algorithm, the beam selection algorithm, and the cell selection algorithm;

for performing each above algorithm operation, the central node base station can receive a measurement result of each base station, for example, a channel matrix from each user to each cell;

secondly, the central node base station runs the joint cell carrier selection algorithm and the beam selection algorithm, jointly decides the carrier selection vector of each user, and jointly designs the beam vector of each user;

thirdly, the central node base station selects, based on the output results of the joint cell carrier selection algorithm and the beam selection algorithm in a certain period of time or parameter statistics, an alternative user in the entire network according to the alternative user selection criterion;

finally, the central node base station decides, according to the reselection criterion, whether the alternative user performs the reselection operation, and initiates the cell reselection flow.

Figure 3:
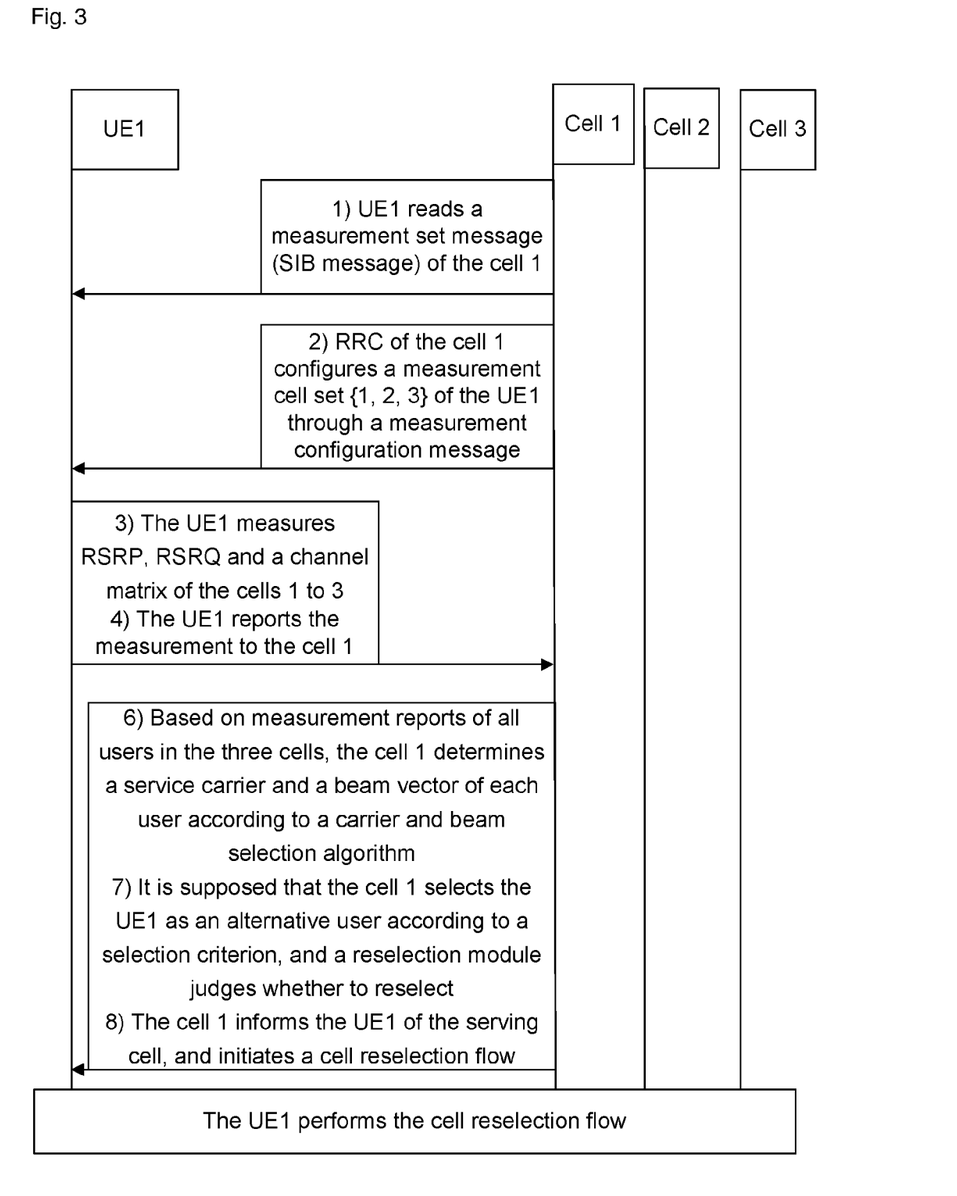
FIG. 3 is a flowchart of selecting a heterogeneous network serving cell based on inter-cell cooperation according to an embodiment of the disclosure.

FIG. 3 is a flowchart of selecting a heterogeneous network serving cell based on inter-cell cooperation according to an embodiment of the disclosure. FIG. 3 shows the implementation process of the above method.

In the LTE, a system message is carried in an SIB message of a broadcast channel SBCH. It is supposed that the cell 1 is the base station where the central node is. The central node base station determines the cells 1, 2 and 3 are the cooperation cells, so they form a measurement cell set; the cells 1, 2 and 3 are broadcasted in this cell through the SIB message extension (namely the measurement cell set is redefined in the SIB message of the LTE). The user UE1 can obtain the measurement cell set, namely the cells 1, 2 and 3, by reading the SIB message.

A measurement configuration of the UE1 to the cells 1, 2 and 3 is realized through Measurement configuration IE in the RRCConnectionReconfiguration message, and the measurement configuration message Measurement configuration IE is formed by extending the original message IE of the LTE system.

The user UE1 completes the measurement of parameters, such as RSRP and Reference Signal Received Quality (RSRQ), required by a cell set (the cells 1, 2 and 3) algorithm, and the measurement of channel matrix according to the measurement configuration by using a public pilot symbol of each of the cells 1, 2 and 3.

The cell 2 and the cell 3 report the measurement results of their own cell users to the cell 1.

The cell 1 collects the measurement values of all users aiming at the cell set (the cells 1, 2 and 3).

The cell 1 calculates the carrier selection vector and the beam selection vector of the user, and informs each cell; then, the PF scheduler of each cell schedules the user in turn;

the cell 1 counts the parameters according to the process of calculating the carrier selection vector and the beam selection vector, and selects the alternative user from all users in the 3 cells according to the alternative user selection criterion; if the user UE1 is the alternative user, the cell reselecting module judges whether the UE1 satisfies the reselection criterion;

the cell 1 calculates, based on the reselection criterion, the cell reselection result of the UE1 according to the reselection algorithm; if the target cell is the cell 3, the selection result is informed to all the cells (the cells 1, 2 and 3).

all the cells (the cells 1, 2 and 3) respectively inform the selection result to each user in them; and the user UE1 enters the cell reselection flow.

Figure 4:
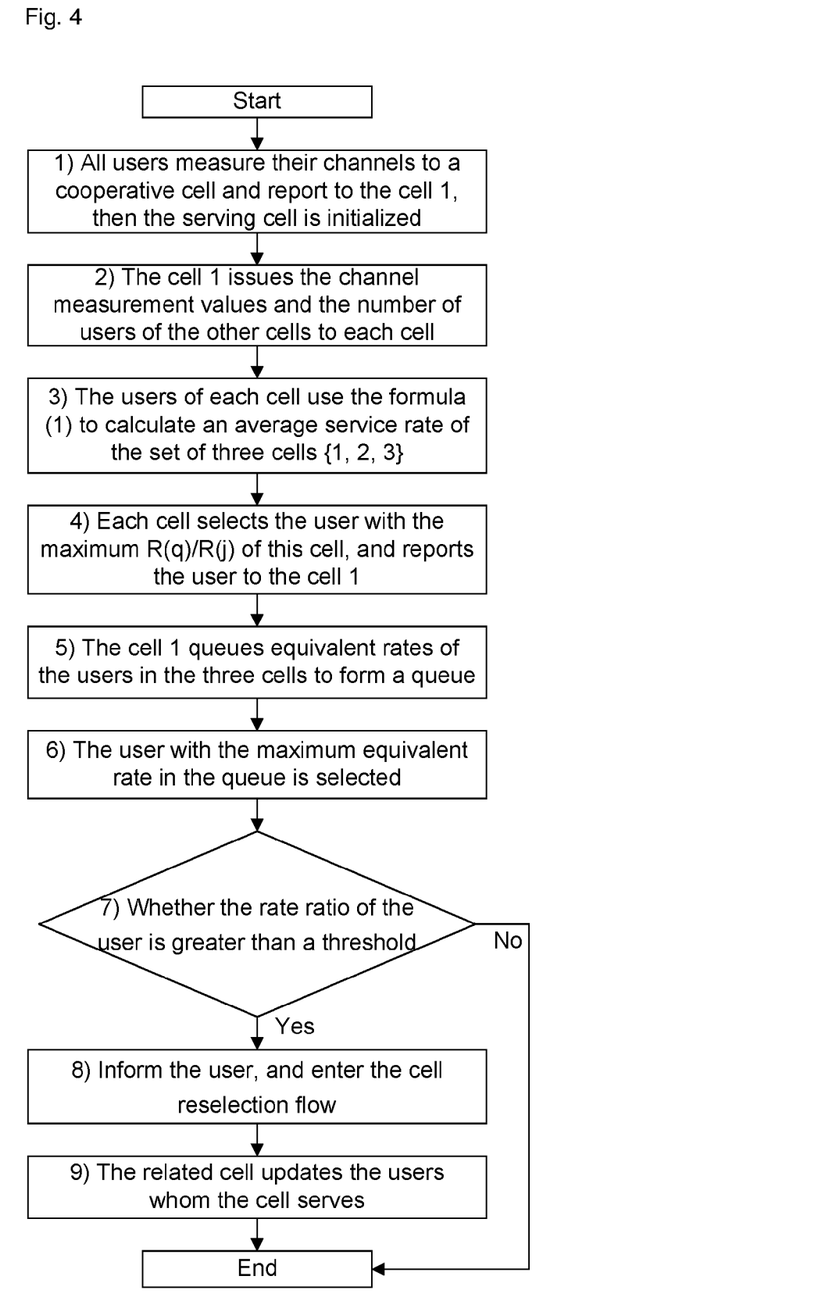
FIG. 4 is a flowchart of performing a cell selection algorithm based on inter-cell cooperation according to another embodiment of the disclosure.

FIG. 4 is a flowchart of performing a cell selection algorithm based on inter-cell cooperation according to another embodiment of the disclosure. FIG. 4 shows the flowchart of performing the cell selection algorithm in the above method.

The algorithm mainly includes three parts, namely preallocation, user cell selection and reselection. The preallocation includes Step 1 and Step 2 in FIG. 4. The pre-allocation mainly provides an initial value for the subsequent cell selection algorithm. So, the cell 1 first collects channel measurement values of all users, and then finds for each user the cell with the maximum equivalent rate $\hat{R}_{b,k,i}$, and pre-allocates it to the user as the serving cell; the cell 1 counts the number of pre-allocated users of each cell and the parameters based on the pre-allocated serving cell; finally, the cell 1 informs each cell of the initial value of the cell selection, the user channels of other cells, and the number of users of each cell, for example, the cell 1 informs the cell 2 the initial value of the cell selection, and the channel values from the user of the cell 2 to the cell 1 and the cell 3.

If the initial value of the cell selection is [20 12 8], that is, there are 20 users in the cell 1, there are 12 users in the cell 2, and there are 8 users in the cell 3, in the user cell selection part of the algorithm, the user of each cell calculates the equivalent rate from him to the three cells, and reports the ratio of the maximum equivalent rate of the other cells to the equivalent rate of this cell to the serving cell; the serving cell 1 first queues 20×1 (20 users, and each user corresponds to an alternative cell) equivalent rates in descending order. In the user cell selection process, the user at the starting position of the queue is selected, and the user and his rate ratio are reported to the central node.

In the reselection step, the central node first queues the rate ratios of the alternative users in the three cells, then selects the first user in the queue, and finally performs cell reselection criterion verification to the user; it is supposed that the user and the base station corresponding to the first maximum value in the queue are m and q' respectively, first it is verified whether the formulae (1 to 6) are satisfied; if so, the user m is allocated to the base station q', at the same time, $Q_{hm}$ of the base station q' is updated, and it is set that the user has been reselected; or else, the algorithm ends.

The last process is a post process, which is intended to inform a service base station of the user of the serving cell which is determined according to the above selection algorithm; then the user initiates the cell reselection flow.

After the above three processes, all users complete a process of updating cooperative selection of a cell.

Embodiment 2

Figure 5:
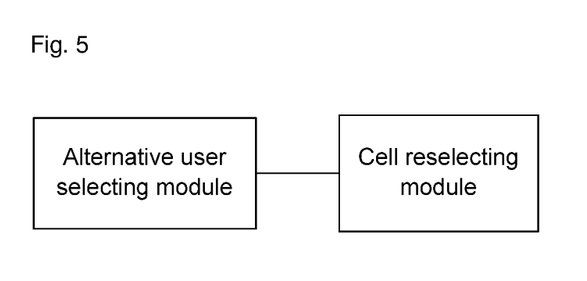
FIG. 5 is a block diagram of a device for selecting a heterogeneous network serving cell based on inter-cell cooperation according to an embodiment of the disclosure.

FIG. 5 is a block diagram of a device for selecting a heterogeneous network serving cell based on inter-cell cooperation according to an embodiment of the disclosure. The present embodiment provides a device for selecting a heterogeneous network serving cell based on inter-cell cooperation, which is a base station device. The base station, which can implement the method in embodiment 1, includes a processor, a program storage device and a data storage device. The device mainly includes the following modules:

an alternative user selecting module, which is configured to, when the device is the central node base station in the heterogeneous network, obtain the alternative users in each cell in the heterogeneous network, and select an alternative user in the entire network from the alternative users in all cells in the heterogeneous network according to the pre-set alternative user selection criterion; and a cell reselecting module, which is configured to, if the alternative user in the entire network needs to perform the reselection operation, initiate the cell reselection flow.

In addition, the device may also serve as the cooperation cell base station in the heterogeneous network; so, the device may also include a reporting module, which is configured to, when the device is the cooperation cell base station in the heterogeneous network, select in this cell the alternative users in a cell according to the pre-set alternative user selection criterion, and report the selected alternative users in the cell to the central node base station.

The alternative user selection criterion involved in the present embodiment includes one or more of the followings:
the system rate maximizing criterion, the degree of freedom restoring criterion, and the frequency reuse criterion.

The system rate maximizing criterion is: selecting the user with the maximum rate ratio $R_m(q)/R_m(j)$ in the rate ratios $R_m(q)/R_m(j)$ of cell reselection of all users as the alternative user, and $R_m(q)$ is the rate obtained in the reselected cell by the user m, and $R_m(j)$ is the rate obtained in the current serving cell j by the user m.

Specifically, the rate ratio $R_m(q)/R_m(j)$ of cell reselection of the user can be determined according to the following process:

calculating $R_m(q)$ and $R_m(j)$ respectively, so as to obtain the rate ratio $R_m(q)/R_m(j)$ of cell reselection of the users;

The rate obtained in each cell by each user is determined according to the following formula:

$$R_m(q^*) = \sum_{k \subset K} \frac{G(y_{q^*,k})E(R_{k,m,q^*})}{y_{q^*,k}}$$

where, $R_m(q^*)$ is the rate obtained in the cell $q^*$ by the user m, and M is the total number of users supported by the cell $q^*$;

$E(R_{k,m,q}^*)$ is the mathematical expectation of $R_{k,m,q}^*$, $R_{k,m,q}^*$ is the instantaneous average maximum data rate that the user m can realize on the carrier k of the cell $q^*$, and K is the total number of carriers in the cell $q^*$;

$y_{q^*,k} = \Sigma_{m \subset M} x_{m,q}^*$ is the number of users accessing the cell $q^*$; when $x_{m,q}^*$ is equal to 1, $q^*$ is the serving cell of the user m; when $x_{m,q}^*$ is equal to 0, $q^*$ is not the serving cell of the user m;

$$G(y_{q^*,k}) = \sum_{m=1}^{y_{q^*,k}} \frac{1}{m}$$

is the diversity gain of multiple users.

The degree of freedom restoring criterion is: in the spatial beam joint selection algorithm in the set time, selecting the user with the maximum number of beam closing times in the numbers of beam closing times of all users as the alternative user.

Specifically, when the numbers of beam closing times of all users are determined in the spatial beam joint selection algorithm in the set time, the parameters A and $b_{k,q}$ when the overall system rate is the maximum are iteratively calculated, and the number of beam closing times of each user is counted in the process of calculating the parameters A and $b_{k,q}$ when the overall system rate is the maximum;

the overall system rate R composed of Q cells is calculated according to the following formula:

$$R=\Sigma_{q=1}^{Q}\Sigma_{k=1}^{K}\log_2(1+a_{k,q}SINR_{k,m,q});$$

where, K is the number of carriers in the cell q, $SINR_{k,m,q}$ is the SINR of the user m in the block fading scenario on the carrier k in the cell q; $a_{k,m}$ is obtained through $A=\{a_{k,m}|a_{k,m}\subset\{0,1\}\}_{K\times M}$; when $a_{k,m}$ is equal to 1, the carrier k is allocated to the user m; when $a_{k,m}$ is equal to 0, the carrier k is not allocated to the user m. Note that, there may be multiple users in each cell, but there is only one user performing data transmission in the cell at any time, then, for any user m, $a_{k,m}$ is equal to $a_{k,q}$; that is, there is no need to differentiate the user m and the cell q in the subscripts of the parameters.

The frequency reuse criterion is: selecting the user with the maximum FFR in the FFRs of all users in the set time as the alternative user.

Specifically, the FFR of the user can be calculated according to the following formula:

$$FFR=FFR_1\cdot P_1+FFR_2\cdot P_2+FFR_3\cdot P_3+\ldots+FFR_Q\cdot P_Q$$

where, $FFR_1=\frac{1}{3}$, $FFR_2=\frac{2}{3}$, $FFR_3=1$, and $FFR_Q=1/Q$; and $P_1, P_2, \ldots P_Q$ are weighting coefficients.

Because the above device can implement the method in embodiment 1, the detailed implementation mode of the device can refer to the corresponding description of the embodiment 1, and will not be elaborated here.

Those ordinary skilled in the art may understand that all or part of the steps in the method can be performed by related hardware instructed through a program; the program may be stored in computer readable storage media, such as a read-only memory, a magnetic disk or a compact disk. Optionally, all or part of the steps of the embodiment may also be implemented by using one or multiple integrated circuits. Correspondingly, each module/unit in the embodiment may be implemented in the form of hardware or in the form of software function module. The disclosure is not limited to any particular combination of hardware and software.

The above is only the preferred embodiments of the disclosure and not intended to limit the disclosure. Any modifications, equivalent replacements, improvements and the like within the spirit and principle of the disclosure shall fall within the scope of protection of the disclosure.

INDUSTRIAL APPLICABILITY

The technical solution of the disclosure considers cell selection and interference management jointly, so that the complexity of an interference management algorithm is reduced, and the effectiveness of interference management is improved, thereby increasing the system capacity of a lower-power node.

What is claimed is:
1. A method for selecting a heterogeneous network serving cell based on inter-cell cooperation, comprising:
obtaining, by a central node base station in a heterogeneous network, alternative users in each cell in the heterogeneous network, and selecting an alternative user in the entire network from the alternative users in all cells in the heterogeneous network according to a pre-set alternative user selection criterion; and
if the alternative user in the entire network needs to perform a reselection operation, initiating a cell reselection flow;
wherein the pre-set alternative user selection criterion comprises one or more of the following: a system rate maximizing criterion, a degree of freedom restoring criterion, or a frequency reuse criterion;
wherein the system rate maximizing criterion is: selecting the user with the maximum rate ratio $R_m(q)/R_m(j)$ in the rate ratios $R_m(q)/R_m(j)$ of cell reselection of all users as the alternative user, wherein $R_m(q)$ is the rate obtained in the reselected cell by the user m, and $R_m(j)$ is the rate obtained in the current serving cell j by the user m;
wherein the degree of freedom restoring criterion is: in a spatial beam joint selection algorithm in a set time, selecting the user with the maximum number of beam closing times in the numbers of beam closing times of all users as the alternative user;
wherein the frequency reuse criterion is: selecting the user with the maximum Fractional Frequency Reuse (FFR) in the FFRs of all users in the set time as the alternative user.

2. The method according to claim 1, further comprising:
selecting in this cell, by each cell base station in the heterogeneous network, the alternative users in a cell according to the pre-set alternative user selection criterion, and reporting the selected alternative users in the cell to the central node base station.

3. The method according to claim 1, wherein determining the rate ratio $R_m(q)/R_m(j)$ of cell reselection of the user according to the following process:
calculating the $R_m(q)$ and the $R_m(j)$ respectively, so as to obtain the rate ratio $R_m(q)/R_m(j)$ of cell reselection of the users;
wherein, determining the rate obtained in each cell by each user according to the following formula:

$$R_m(q^*) = \sum_{k\subset K} \frac{G(y_{q^*,k})E(R_{k,m,q^*})}{y_{q^*,k}}$$

where, $R_m(q^*)$ is the rate obtained in the cell q* by the user m;
$E(R_{k,m,q}^*)$ is the mathematical expectation of $R_{k,m,q}^*$
$R_{k,m,q}^*$ is the instantaneous average maximum data rate that the user m can realize on the carrier k of the cell q*, and K is the total number of carriers in the cell q*;
$y_{q^*,k}=\Sigma_{m\subset M}x_{m,q}^*$ is the number of users accessing the cell q*; when $x_{m,q}^*$ is equal to 1, q* is the serving cell of the user m; when $x_{m,q}^*$ is equal to 0, q* is not the serving cell of the user m; M is the total number of users supported by the cell q*;

$$G(y_{q^*,k}) = \sum_{m=1}^{y_{q^*,k}} \frac{1}{m}$$

is a diversity gain of multiple users.

4. The method according to claim 1, wherein in the spatial beam joint selection algorithm in the set time, the process of determining the number of beam closing times of the user is as follows:
iteratively calculating parameters A and $b_{k,q}$ when the overall system rate is the maximum, and counting the number of beam closing times of each user in the process of calculating the parameters A and $b_{k,q}$ when the overall system rate is the maximum;
wherein, calculating the overall system rate R composed of Q cells according to the following formula:

$$R=\Sigma_{q=1}^{Q}\Sigma_{k=1}^{K}\log_2(1+a_{k,q}\text{SINR}_{k,m,q});$$

where, K is the number of carriers in the cell q;
$\text{SINR}_{k,m,q}$ is the Signal to Interference plus Noise Ratio (SINR) of the user m in a block fading scenario on the carrier k in the cell q;
when $a_{k,q}$ is equal to 1, the carrier k in the cell q is allocated to the user m; when $a_{k,q}$ is equal to 0, the carrier k in the cell q is not allocated to the user m.

5. The method according to claim 1, wherein calculating the FFR of the user according to the following formula:

$$\text{FFR}=\text{FFR}_1\cdot P_1+\text{FFR}_2\cdot P_2+\text{FFR}_3\cdot P_3+L+\text{FFR}_Q\cdot P_Q;$$

where, $\text{FFR}_1=1/3$, $\text{FFR}_2=2/3$, $\text{FFR}_3=1$, and $\text{FFR}_Q=1/Q$; and $P_1$, $P_2$, L $P_Q$ are weighting coefficients.

6. A non-transitory computer readable storage medium, in which a computer program is stored; the computer program comprises a program instruction; when the program instruction is executed by a base station device, the device performs a method according to claim 1.

7. A device for selecting a heterogeneous network serving cell based on inter-cell cooperation, comprising:
a processor; and
a memory for storing instructions executable by the processor;
wherein the processor is configured to: obtain alternative users in each cell in a heterogeneous network, and select an alternative user in the entire network from the alternative users in all cells in the heterogeneous network according to a pre-set alternative user selection criterion; and is further configured to, if the alternative user in the entire network needs to perform a reselection operation, initiate a cell reselection flow;
wherein the pre-set alternative user selection criterion comprises one or more of the following: a system rate maximizing criterion, a degree of freedom restoring criterion, or a frequency multiplexing criterion;
wherein the system rate maximizing criterion is: selecting the user with the maximum rate ratio $R_m(q)/R_m(j)$ in the rate ratios $R_m(q)/R_m(j)$ of cell reselection of all users as the alternative user, wherein $R_m(q)$ is the rate obtained in the reselected cell by the user m, and $R_m(j)$ is the rate obtained in the current serving cell j by the user m;
wherein the degree of freedom restoring criterion is: in a spatial beam joint selection algorithm in a set time, selecting the user with the maximum number of beam closing times in the numbers of beam closing times of all users as the alternative user;
wherein the frequency reuse criterion is: selecting the user with the maximum Fractional Frequency Reuse (FFR) in the FFRs of all users in the set time as the alternative user.

8. The device according to claim 7, wherein the processor is further configured to:
calculate $R_m(q)$ and $R_m(j)$ respectively, so as to obtain the rate ratio $R_m(q)/R_m(j)$ of cell reselection of the users;
wherein, determining the rate obtained in each cell by each user according to the following formula:

$$R_m(q^*) = \sum_{k \subset K} \frac{G(y_{q^*,k})E(R_{k,m,q^*})}{y_{q^*,k}};$$

where, $R_m(q^*)$ is the rate obtained in the cell $q^*$ by the user m;
$E(R_{k,m,q}^*)$ is the mathematical expectation of $R_{k,m,q}^*$, $R_{k,m,q}^*$ is the instantaneous average maximum data rate that the user m can realize on the carrier k of the cell $q^*$, and K is the total number of carriers in the cell $q^*$;
$y_{q^*,k}=\Sigma_{m \subset M}x_{m,q}^*$ is the number of users accessing the cell $q^*$; when $x_{m,q}^*$ is equal to 1, $q^*$ is the serving cell of the user m; when $x_{m,q}^*$ is equal to 0, $q^*$ is not the serving cell of the user m; M is the total number of users supported by the cell $q^*$;

$$G(y_{q^*,k}) = \sum_{m=1}^{y_{q^*,k}} \frac{1}{m}$$

is a diversity gain of multiple users.

9. The device according to claim 7, wherein the processor is further configured to determine the number of beam closing times of the user in the spatial beam joint selection algorithm in the set time, comprising:
iteratively calculating parameters A and $b_{k,q}$ when the overall system rate is the maximum, and counting the number of beam closing times of each user in the process of calculating the parameters A and $b_{k,q}$ when the overall system rate is the maximum;
wherein, calculating the overall system rate R composed of Q cells according to the following formula:

$$R=\Sigma_{q=1}^{Q}\Sigma_{k=1}^{K}\log_2(1+a_{k,q}\text{SINR}_{k,m,q})$$

where, K is the number of carriers in the cell q;
$\text{SINR}_{k,m,q}$ is the Signal to Interference plus Noise Ratio (SINR) of the user m in a block fading scenario on the carrier k in the cell q;
when $a_{k,q}$ is equal to 1, the carrier k in the cell q is allocated to the user m; when $a_{k,q}$ is equal to 0, the carrier k in the cell q is not allocated to the user m.

10. The device according to claim 7, wherein the processor is further configured to calculate the FFR of the user according to the following formula:

$$\text{FFR}=\text{FFR}_1\cdot P_1+\text{FFR}_2\cdot P_2+\text{FFR}_3\cdot P_3+L+\text{FFR}_Q\cdot P_Q;$$

where, $\text{FFR}_1=1/3$, $\text{FFR}_2=2/3$, $\text{FFR}_3=1$, and $\text{FFR}_Q=1/Q$; and $P_1$, $P_2$, L $P_Q$ are weighting coefficients.

11. The device according to claim 7, the processor is further configured to, when the device is a cooperation cell base station in the heterogeneous network, select in this cell the alternative users in a cell according to the pre-set alternative user selection criterion, and report the selected alternative users in the cell to a central node base station.

* * * * *